United States Patent [19]

Courbet et al.

[11] 3,972,393

[45] Aug. 3, 1976

[54] FRICTION PAD AND SUPPORT FOR A DISC BRAKE

[75] Inventors: Pierre Courbet, Villiers-le-Bel; Claude Le Marchand, Domont, both of France

[73] Assignee: Societe Anonyme D.B.A., Paris, France

[22] Filed: Oct. 29, 1974

[21] Appl. No.: 518,648

[30] Foreign Application Priority Data

Nov. 8, 1973 France.............................. 73.39685

[52] U.S. Cl................................ 188/73.3; 188/73.1; 188/73.5
[51] Int. Cl.² ........................................ F16D 65/04
[58] Field of Search................ 188/72.4, 72.5, 73.3, 188/73.1, 71.1, 73.6, 73.5, 250 B

[56] References Cited
UNITED STATES PATENTS

| | | | |
|---|---|---|---|
| 3,189,129 | 6/1965 | Burnett............................ | 188/73.6 |
| 3,268,034 | 8/1966 | Burnett........................... | 188/73.3 X |
| 3,368,647 | 2/1968 | Laverdant......................... | 188/73.3 |

FOREIGN PATENTS OR APPLICATIONS

| | | | |
|---|---|---|---|
| 1,357,517 | 2/1964 | France............................... | 188/73.3 |

*Primary Examiner*—George E. A. Halvosa
*Attorney, Agent, or Firm*—Ken C. Decker; William N. Antonis

[57] ABSTRACT

A pad in which an extension is formed with four sliding and bracing edges arranged in pairs to slidably cooperate with corresponding grooves provided in the torque taking member of a disc brake is characterized in that the extension forms a T of which each end comprises a first of the edges substantially parallel to the line of application of the tangential force generated during braking, and a second of the edges inclined with respect to a plane perpendicular to the line of application of the tangential force. The angle so defined is such that the forces transmitted to the torque taking member are minimized.

4 Claims, 4 Drawing Figures

FRICTION PAD AND SUPPORT FOR A DISC BRAKE

The invention relates to a friction pad for a disc brake.

More particularly, it concerns a pad for a disc brake of the type in which the brake applying means are associated with a torque taking member so as to urge at least one pad into frictional contact with a rotary disc, the pad comprising a backing plate to which a friction lining is fixed and which is slidable on and braced against two circumferentially spaced anchoring and carrying surfaces provided in the torque taking member for each direction of disc rotation, the surfaces being radially offset relative to the tangential force generated during frictional contact between the lining and disc.

Disc brakes of this type, whether the torque taking member is a fixed calliper or a calliper sliding on a fixed support, have the advantage of being compact and light. Unfortunately, however, the radial offsetting of the surfaces on which the pads slide and are braced relative to the frictional surfaces of the pads generates, during braking, a tilting torque which tends to tip the pads relative to the torque taking member. To overcome this disadvantage, the backing plate portion and the torque taking member portions co-operating with the backing plate must be relatively large, which cancels out some of the inherent advantages of this type of brake.

The invention proposes a pad for a brake as defined above in which the forces transmitted by the pads to the torque taking member are substantially reduced for a brake of given dimensions, so that the surfaces on which the pads slide and are braced, and consequently the total weight of the brake, are substantially smaller than in prior art disc brakes.

This end is achieved in a disc brake pad embodying the invention, which is of the type comprising a backing plate to which a friction lining is fixed and which has an extension on which there are formed four sliding and bracing edges arranged in pairs, the lining being adapted to frictionally engage a rotary disc so as to generate a tangential braking force. According to the invention, the extension forms a T of which each end comprises a first of said edges substantially parallel to the line of application of the tangential force, and a second of said edges defining an angle other than zero with a plane perpendicular to the line of application of the tangential force.

According to a preferred embodiment of the invention, the tangent of the angle is substantially equal to the distance from the centre of the second edge of a first end of the T-shaped extension to the line of application of the tangential force, divided by the distance from the centre of the first edge of the second end of the T-shaped extension to the centre of the second edge of the first end of the extension in a direction parallel to the line of application of the tangential force.

The invention will now be described with reference to the accompanying drawings, in which.

Figure 1:
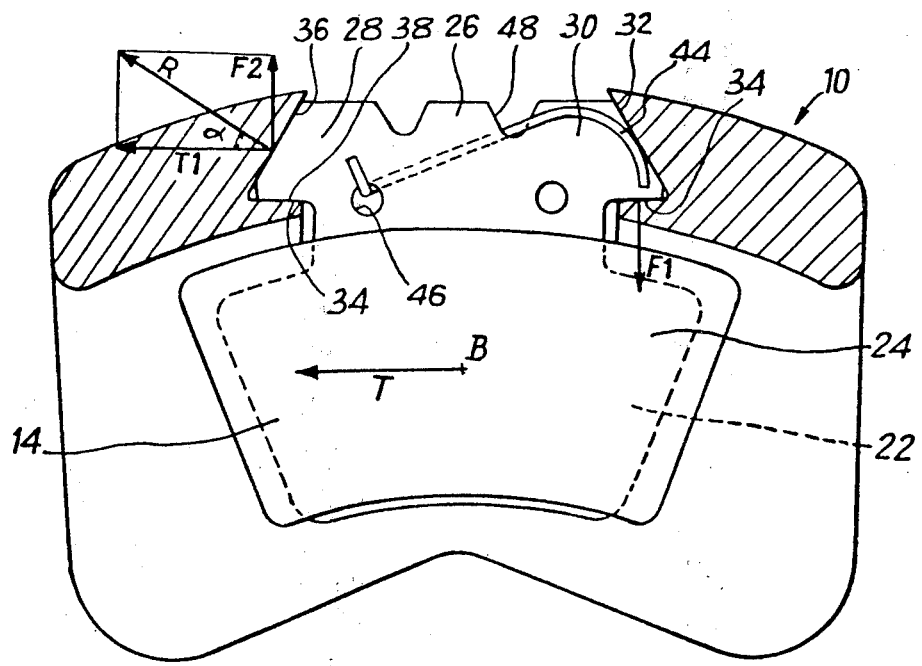
FIG. 1 represents a partial cross-section through a disc brake embodying the invention.
Figure 2:
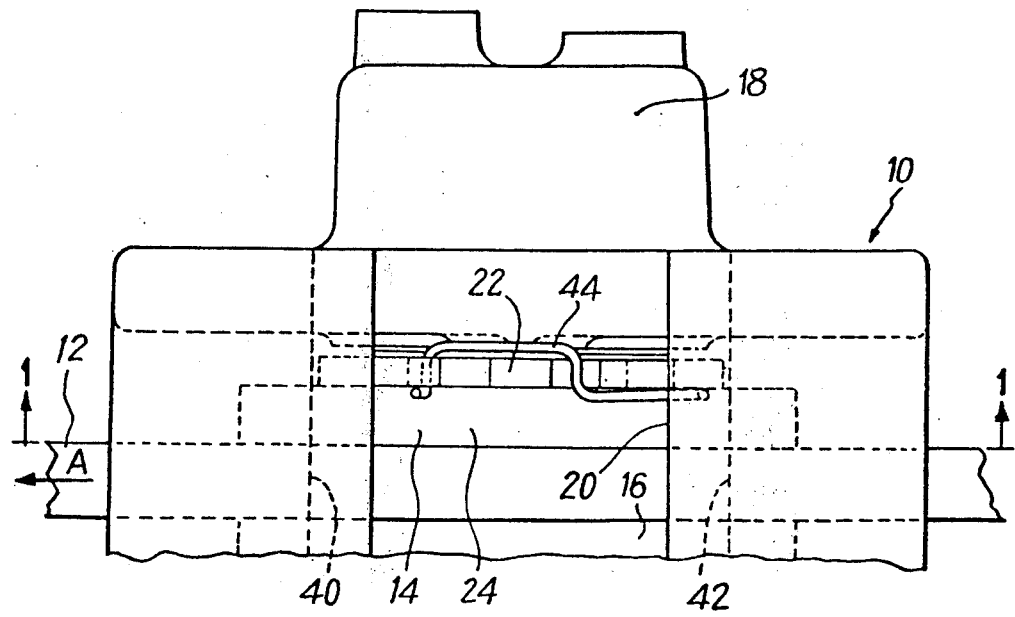
FIG. 2 is a plan view of the brake shown in FIG. 1.

In the disc brake shown in FIGS. 1 and 2, a torque taking member generally designated 10 straddles a disc 12 and comprises brake applying means to apply two pads 14, 16 to the corresponding faces of the disc 12. The brake applying means are, in the case of the pad 14, a fluid-pressure-operated brake actuator 18 and, for the pad 16, either a second brake actuator (not shown) or a reaction element of the torque taking member, which then slides axially on a fixed support (not shown).

Figure 3:
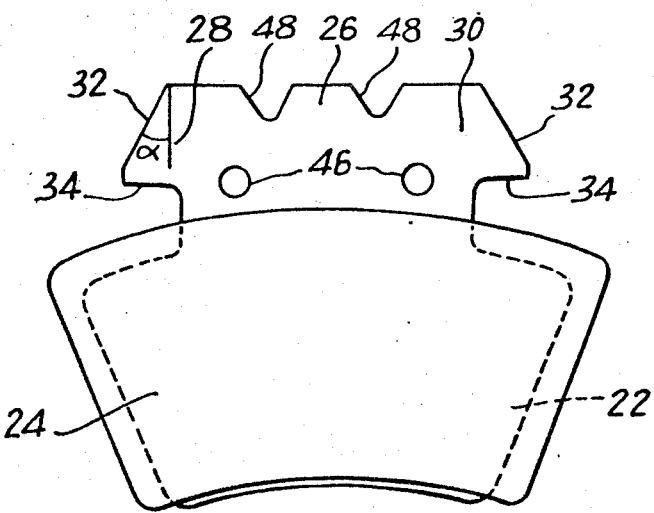
FIG. 3 illustrates a pad for the brake shown in FIGS. 1 and 2.

Each pad is formed of a backing plate 22 to which a friction lining 24 is attached. As FIG. 3 shows, each backing plate 22 has a T-shaped extension 26 extending radially outwards from the periphery of the disc 12. Each circumferentially spaced end 28, 30 of the extension 26 has two sliding and bracing edges 32, 34 which co-operate with corresponding anchoring and carrying surfaces 36, 38 on the torque taking member 10. The surfaces 36, 38 form two axially extending grooves 40, 42 in the axial edges of an aperture 20, provided in that part of the torque taking member 10 which straddles the disc. In accordance with the invention, the pads are braced only by way of one of their edges 32 for each direction of rotation of the disc 12. The edges 34 prevent the pads from escaping radially inwards into the brake.

A metal wire 44 forming a noise-reducing spring is interposed between each pad 14, 16 and the torque taking member 10. The wire 44 passes through a hole 46 and notch 48 formed in the pad extension 26, and bears on the surface 36 of the groove 42 in the described embodiment.

Operation of the brake applying means produces frictional contact between each lining 28 and the associated surface of the disc 12. When the disc 12 turns in the direction of arrow A in FIG. 2, this generates a tangential force T of which the point of application B is substantially at the centre of the friction surface of the pad 14. Because the sliding and bracing surfaces 36, 38 in the grooves 40, 42 are radially offset relative to the point of application B of the force T, a tilting torque is generated which is proportional both to the force T and to the distance from the centre of the edge 32 of the end 28 of the extension on the pad 14 to the line of application of the force T, in a plane parallel to the plane of the disc. Whereas the force T is entirely transmitted at T1 to the surface 36 of the groove 40 by way of the edge 32 of the pad end 28, the tilting torque is distributed between the surface 36 of the groove 40 and the surface 38 of the groove 42.

Since the force T is transmitted entirely to the torque taking member 10 by way of the edge 32 of the pad end 28, as indicated in T1 the role of the edge 34 of the opposite end 30 of the extension 26 is solely to transmit part F1 of the tilting torque to the torque taking member. The edge 32 of the pad end 28, transmits to the torque taking member 10 both the force T1 and a force F2 due to the tilting torque, of which the direction is parallel to that of the force F1. The orientation of the edge 34 of the extension end 30 therefore determines the orientation of the forces F1, F2 which are due to the tilting torque, and which act on the torque taking member 10 by way of the edges 32, 34 placed respectively at the ends 28, 30 of the extension 26. In accordance with the invention, the edge 34 is substantially parallel to the line of application of the force T, so that, for a given distance between the centres of the opposite edges 32 and 34, the forces F1, F2 resulting from the tilting torque are minimal.

The directions of the forces F1 and F2 are determined by the normal to the surface 34, and their intensities are equal to the intensity of the force T1 when this is multiplied by the distance separating the centre of the surface 32 from the line of application of the force T, in a plane parallel to the plane of the disc, and is divided by the distance between the centres of the edges 32, 34 at the ends 28, 30 respectively of the pad extension 26. The direction of the resultant force R exerted on the torque taking member 10 by way of the edge 32 can therefore be entirely determined as a function of the dimensions of the pad, whatever the intensity of the force T.

Indeed, the resultant R defines with the force T1 an angle $\alpha$ of which the tangent is substantially equal to the modulus of the force F2 divided by the modulus of the force T1. The tangent of the angle $\alpha$ is therefore equal to the distance from the centre of the edge 32 of the extension end 28 to the line of application of the force T, in a plane parallel to the plane of the disc, divided by the distance separating the centres of the edges 32, 34 of the ends 28, 30 respectively, in a direction parallel to the line of application of the force T.

According to the invention, the edge 32 is made substantially perpendicular to the resultant R, so that the edge 32 is braced against the anchoring surface 36 of the groove 40 in the torque taking member 10 under optimum conditions. This is still possible, since the direction of the force R, is as already stated, independent of the intensity of the force T.

As FIG. 3 shows, the edges 32 of the pad then form an angle $\alpha$ with a plane perpendicular to the line of application of the force T.

According to a preferred embodiment of the invention, the pads 14, 16 are symmetrical relative to an axial plane perpendicular to the force T, so that they can be reversed and function identically, irrespective of the direction of rotation of the disc 12.

For a given dimension of the aperture 20, that is, a given spacing of the grooves 40, 42 and for a given pad dimension, the orientation of the edges 32, 34 of the pads in accordance with the invention minimizes the stresses transmitted by these edges to the torque taking member 10 and therefore enables the dimensions of the surfaces 36, 38 to be reduced. The volume and the total weight of the brake are therefore appreciably smaller than in prior disc brakes of this type.

Figure 4:
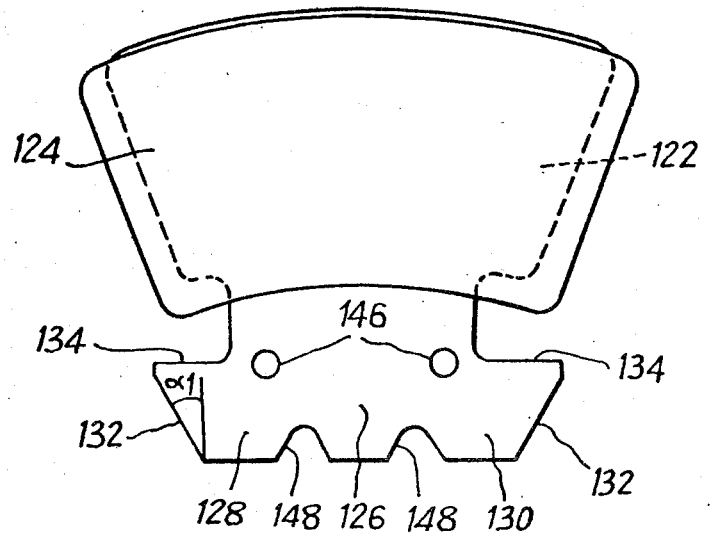
FIG. 4 shows a pad for another brake embodying the invention.

FIG. 4 shows a pad for a disc brake in which the rotary disc is annular and the torque taking member is placed inside the disc. Portions of this pad fulfilling the same functions as those of the pad shown in FIG. 3 are designated by the same reference numerals plus 100.

The pad shown in FIG. 4 is formed of a backing plate 122 and friction lining 124. It has a T-shaped extension 126 directed radially towards the centre of the disc (not shown). Extension 126 have four sliding and bracing edges 132, 134. The edges 134 are substantially parallel to the line of application of the tangential force generated during frictional engagement between the lining 128 and the rotary disc. The edges 132 define with a plane perpendicular to the line of application of the tangential force generated during frictional engagement between the lining 128 and the rotary disc.

What we claim is:

1. In combination, a friction pad, for a disc brake having a rotor, and a torque member with torque-receiving surfaces for absorbing braking torque generated by engagement of said friction pad with said rotor, said friction pad comprising a backing plate and friction material secured to a portion of said backing plate, said backing plate including a generally T-shaped extension, said extension defining base and transverse portions, said base portion projecting from the portion of the backing plate covered by the friction material, said transverse portion extending from the base portion, each end of said transverse portion terminating in carrying and anchoring edges, said friction pad and torque member being constructed and arranged so that said friction pad generates a tangential braking force and a tilting torque tending to tip said friction pad when said friction pad is urged into braking engagement with said rotor, each of said carrying edges being substantially parallel to the theoretical line of application of said tangential braking force, each of said anchoring edges defining an acute angle with respect to their corresponding carrying edges, said tangential braking force and a portion of the force generated by said tilting torque being transmitted through a corresponding one of said anchoring edges to a corresponding torque-receiving surface on said torque member when the rotor is rotating in a given direction, the remainder of the force generated by said tilting torque being transmitted through the carrying edge associated with the other of said anchoring edges to the corresponding torque-receiving surface on said torque member.

2. The combination as claimed in claim 1, wherein the tangent of the acute angle is substantially equal to the distance from the center of the anchoring edge of one end of the transverse portion of the extension to the line of application of the braking force, divided by the distance from the center of the anchoring edge of the other end of the transverse portion of the extension to the center of the anchoring edge of the one end of the transverse portion of the extension in a direction parallel to the line of application of the braking force.

3. The combination as claimed in claim 1, wherein the extension contains at least one hole and at least one notch, said notch being provided in the joining edge of the transverse portion of the extension interconnecting the anchoring edges.

4. The combination, claimed in claim 3, wherein said pad is substantially symmetrical relative to a plane perpendicular to the line of application of the braking force and passing through the point of application of the braking force.

* * * * *